United States Patent [19]

Inoue et al.

[11] Patent Number: 4,970,256

[45] Date of Patent: Nov. 13, 1990

[54] RESIN COMPOSITION

[75] Inventors: Masakazu Inoue, Koka; Kuniaki Asai, Tondabayashi; Yasuro Suzuki, Ichihara, all of Japan

[73] Assignee: Sumitomo Chemical Company Limited, Osaka, Japan

[21] Appl. No.: 319,945

[22] PCT Filed: Jun. 30, 1987

[86] PCT No.: PCT/JP87/00443

§ 371 Date: Feb. 28, 1989

§ 102(e) Date: Feb. 28, 1989

[87] PCT Pub. No.: WO89/00177

PCT Pub. Date: Jan. 12, 1989

[51] Int. Cl.$^5$ .................. C08L 69/00; C08L 67/03; C08L 67/02
[52] U.S. Cl. .................. 524/404; 524/425; 524/431; 524/443; 524/445; 524/449; 524/451; 524/454; 524/508; 525/109; 525/133; 525/148; 525/176
[58] Field of Search .............. 525/133, 148, 176, 109; 524/404, 425, 431, 443, 445, 449, 451, 454, 508

[56] References Cited

U.S. PATENT DOCUMENTS 4,324,869  4/1982  Robeson .................. 525/68

Primary Examiner—John C. Bleutge
Assistant Examiner—David Buttner
Attorney, Agent, or Firm—Birch, Stewart, Kolasch & Birch

[57] ABSTRACT

A resin composition which comprises
(A) 60 to 99% by weight of a composition comprising 1 to 99% by weight of a polyarylene ester and 99 to 1% by weight of a polycarbonate or a polyalkylene terephthalate, and
(B) 40 to 1% by weight of an ethylene copolymer consisting of 50 to 90% by weight of ethylene, 5 to 49% by weight of an $\alpha\beta$-unsaturated carboxylic acid alkyl ester and 0.5 to 10% by weight of maleic anhydride, said resin composition having significantly improved impact properties with less dependency on the radius of notched part without deteriorating the excellent heat distortion resistance or excellent processability, barrier properties, chemical resistance, heat resistance of (A) of the composition comprising a polyarylene ester and a polycarbonate or a polyalkylene terephthalate and being useful for utilities such as parts for electric and/or electronic equipment, parts of automobiles and parts of office automation equipment which have been desired to be miniaturized and to have a thin-wall.

12 Claims, No Drawings

RESIN COMPOSITION

TECHNICAL FIELD

This invention relates to a resin composition having excellent impact properties.

TECHNICAL BACKGROUND

It is known that a composition comprising 1 to 99% by weight of a polyarylene ester and 99 to 1% by weight of a polycarbonate or polyalkylene terephthalate is an excellent composition having both impact resistance and heat distortion resistance and excellent processability, barrier properties, chemical resistance and heat resistance [cf. Japanese Patent Second Publication (Kokoku) No. 27061/1975, Japanese Patent First Publication (Kokai) Nos. 54159/1973 and 34342/1975].

Although the composition shows excellent impact properties under certain conditions, it still has very low impact resistance under other conditions. That is, when a shaped article prepared from the composition has a large radius of notched part, it shows very high impact strength, but when the shaped article has a small radius of notched part, it shows very low impact strength.

Thus, it has been desired to obtain an improved resin composition which has improved impact properties with less dependency on the radius of notched part and can show excellent impact properties even in articles having a small radius of notched part.

DESCRIPTION OF THE INVENTION

Under the above circumstances, the present inventors have intensively studied and have found that by incorporating an ethylene copolymer consisting of ethylene, an α,β-unsaturated carboxylic acid alkyl ester and maleic anhydride into a composition comprising a polyarylene ester and a polycarbonate or a polyalkylene terephthalate, there can be obtained an improved resin composition having excellent impact properties while maintaining the original excellent impact properties of the composition comprising a polyarylene ester and a polycarbonate or a polyalkylene terephthalate.

That is, an object of the present invention is to provide a composition having improved impact properties with less dependency on the radius of notched part without deteriorating the excellent properties such as heat distortion resistance of the composition comprising an polyarylene ester and a polycarbonate or a polyalkylene terephthalate.

The composition of this invention comprises (A) 60 to 99% by weight of a composition comprising 1 to 99% by weight of a polyarylene ester and 99 to 1% by weight of a polycarbonate or a polyalkylene terephthalate, and (B) 40 to 1% by weight of an ethylene copolymer consisting of 50 to 90% by weight of ethylene, 5 to 49% by weight of an α,β-unsaturated carboxylic acid alkyl ester and 0.5 to 10% by weight of maleic anhydride.

The polyarylene ester used in this invention includes polyesters produced from a diphenol or a derivative thereof and an aromatic dicarboxylic acid or a derivative thereof.

The diphenols are specifically compounds of the formula:

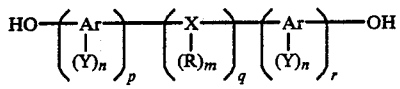

wherein Ar is an aromatic nucleus such as a phenylene nucleus, a biphenylene nucleus, or a napthylene nucleus, R is a hydrogen atom, an alkyl group ($C_1$–$C_4$ alkyl group, e.g. methyl or ethyl, etc.), a halogenated $C_1$–$C_4$ alkyl group, an aryl group (e.g. phenyl, naphthyl), a halogenated aryl group, an aralkyl group (e.g. benzyl, phenylethyl), a halogenated aralkyl group, a $C_1$–$C_4$ alkylsubstituted aryl group, a halogenated $C_1$–$C_4$ alkyl-substituted aryl group, an alicyclic group, or a halogenated alicyclic, X is a $C_1$–$C_4$ alkylene or $C_1$–$C_4$ alkylidene group (e.g. methylene, ethylene, propylene, ethylidene, propylidene, isopropylidene, etc.); or two or more $C_1$–$C_4$ alkylene or $C_1$–$C_4$ alkylidene groups which are mutually bound via an aromatic group, a tertiary amino group i.e. [—N(alkyl)—], an ether group (i.e. —O—), a carbonyl group (i.e. —CO—), or a sulfur-containing group such as sulfide (—S—), sulfoxide (—SO—) or sulfonyl (—$SO_2$—); or X may be a divalent alicyclic group, or a sulfur-containing group such as sulfide, sulfoxide or sulfonyl, an ether group, a carbonyl group, or a tertiary amino group, Y is a halogen atom, a nitro group, or the same as R' or OR' (R' is the same as R as defined above), m is 0 or an integer of up to the number of hydrogen atoms being able to be substituted on the group X, n is 0 or an integer of up to the number of hydrogen atoms being able to be substituted on the aromatic Ar nucleus, p is an integer of at least one, q is an integer of 0 to 1, and r is an integer of at least one (provided that when q is 0, r may be 0).

When the diphenols as mentioned above have one or more substituents Y, these Ys may be the same or different. The same is applicable for R and R. The substituent Y and the hydroxy group on the aromatic nucleus, may be substituted at any correlation position of ortho-, meta- or para-. The above diphenols may also be used in a combination of two or more.

Specific examples of the diphenols are bis(4-hyroxyphenyl)methane, bis(4-hydroxy-3-methylphenyl)methane, bis(4-hydroxy-3,5-dichlorophenyl)methane, bis(4-hydroxy-3,5-dibromophenyl)methane, bis(4-hydroxy-3,5-difluorophenyl)methane, bis(4-hydroxyphenyl) ketone, bis(4-hydroxyphenyl)sulfide, bis(4-hydroxyphenyl)sulfone, 4,4-dihydroxydiphenyl ether, 1,1-bis(4-hydroxyphenyl)ethane, 2,2-bis(4-hydroxyphenyl)propane, 2,2-bis(hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxynaphthyl)propane, bis(4-hydroxyphenyl)phenylmethane, bis(4-hydroxyphenyl)diphenylmethane, bis(4-hydroxyphenyl)-4-methylphenylmethane, 1,1-bis(4-hydroxyphenyl)-2,2,2-trichloroethane, bis(4-hydroxyphenyl)-(4-chlorophenyl)methane, 1,1-bis(4-hydroxyphenyl)cyclohexane, bis(4-hydroxyphenyl)cyclohexylmethane, 4,4-dihydroxydiphenyl, 2,2-dihydroxydiphenyl, dihydroxynaphthalene (e.g. 2,6-dihydroxynaphthalene), hydroquinone, resorcinol, 2,6-dihydroxytoluene, 2,6-dihydroxychlorobenzene, 3,6-dihydroxytoluene.

The derivative of the diphenols includes dialkyl or diphenyl esters of the above diphenols. These may also be used in a mixture thereof.

The aromatic dicarboxylic acid is a compound of the formula:

$$HOOC-Ar'-COOH$$

wherein Ar' is an arylene group such as o-phenylene, m-phenylene, p-phenylene, or naphthylene which may be substituted by a $C_1$-$C_4$ alkyl group or a halogen atom. These may also be used in a combination of two or more.

The derivative of the aromatic dicarboxylic acids include dichlorides of the aromatic dicarboxylic acids, and diesters such as $C_1$-$C_4$ alkyl or phenyl diesters. These may also be used in a combination of two or more.

The polyarylene esters used in this invention can be prepared from the above-mentioned diphenols or derivatives thereof and the above-mentioned aromatic dicarboxylic acids or derivatives thereof by a conventional method such as interfacial polycondensation, solution polycondensation, melt polycondensation, or the like.

Preferred polyarylene esters have the structure comprising a residue of bisphenol A [i.e. 2,2-bis(4-hydroxyphenyl)propane], terephthalic acid residue and isophthalic acid residue, which is commercially available under a tradename of "U Polymer" (manufactured by Unitika Ltd.).

The polycarbonate used in this invention is 4,4-dihydroxydiarylalkane polycarbonates, and includes, for example, polycarbonates produced from a 4,4-dihydroxydiphenylalkane [e.g. bis(4-hydroxyphenyl)methane, bis(4-hydroxyphenyl)ethane, 2,2-(4-hydroxyphenyl)propane, bis(4-hydroxy-3,5-dichlorophenyl)methane, 2,2-(4-hydroxy-3,5-dimethylphenyl)propane, bis(4-hydroxyphenyl)phenylmethane, etc.) with phosgene or diphenyl carbonate.

The polyalkylene terephthalate used in this invention includes compounds produced by reacting terephthalic acid or a functional derivative thereof with an alkylene glycol by a known method, and includes specifically, for example, polyethylene terephthalate, polybutylene terephthalate.

The ethylene copolymer used in this invention consists of the monomer components selected from ethylene, an $\alpha,\beta$-unsaturated carboxylic acid alkyl ester, and maleic anhydride, that is, it consists of 50 to 90% by weight, preferably 60 to 85% by weight, of ethylene, 5 to 49% by weight, preferably 7 to 45% by weight, of an $\alpha,\beta$-unsaturated carboxylic acid alkyl ester, and 0.5% to 10% by weight, preferably 1 to 8% by weight, of maleic anhydride.

The $\alpha,\beta$-unsaturated carboxylic acid alkyl ester includes esters of unsaturated carboxylic acids having 3 to 8 carbon atoms (e.g. acrylic acid, methacrylic acid, etc.) with a $C_1$-$C_4$ alkyl, and suitable examples thereof are methyl acrylate, ethyl acrylate, n-propyl acrylate, isopropyl acrylate, n-butyl acrylate, t-butyl acrylate, isobutyl acrylate, methyl methacrylate, ethyl methacrylate, n-propyl methacrylate, isopropyl methacrylate, n-butyl methacrylate, t-butyl methacrylate, and isobutyl methacrylate, among which ethyl acrylate, n-butyl acrylate, and methyl methacrylate are particularly preferable.

The ethylene copolymer is incorporated into a composition comprising 1 to 99% by weight of a polyarylene ester and 99 to 1% by weight of a polycarbonate or a polyalkylene terephthalate (hereinafter referred to as "A composition") in an amount of 40 to 1% by weight to 60 to 99% by weight of the A composition (based on the whole weight of the A composition and the ethylene copolymer). When the A composition is used in an amount of over 99% by weight and the ethylene copolymer is used in an amount of less than 1% by weight, the desired impact properties are not sufficiently improved, and on the other hand, when the amount of the A composition is less than 60% by weight and the amount of the ethylene copolymer is more than 40% by weight, the characteristic heat distortion resistance of the A composition is disadvantageously significantly deteriorated.

The composition of this invention can be prepared by any conventional methods. For instance, each component may be supplied to a melt mixer separately. Alternatively, the materials in each component are previously mixed with a mortar, a Henschel mixer, a ball mill, ribbon blender, or the like, and thereafter they are supplied to a melt mixer.

The composition of this invention may also be incorporated with one or more of other conventional additives unless the desired properties are affected, for example, antioxidants, heat stabilizers, ultraviolet absorbers, lubricants, colorants such as dyestuffs and pigments, fire retardants, fire retardant auxiliarys, antistatic agents, and the like.

The composition may further be incorporated with a small amount of other thermoplastic resins (e.g. polyethylenes, polypropylenes, polyamides, polysulfones, polyether sulfones, modified polyphenylene oxides, polyphenylene sulfides, etc.), thermosetting resins (e.g. phenol resins, epoxy resins, etc.), reinforcing agents (e.g. glass fiber, carbon fiber, boron fiber, silicone carbide fiber, asbestos fiber, metallic fiber, etc.), fillers (e.g. clay, mica, silica, graphite, glass beads, alumina, calcium carbonate, talc, etc.), and the like, which are used in an appropriate amount in accordance with the desired utilities.

BEST MODE FOR PRACTICING THE INVENTION

This invention is illustrated by the following Examples but should not be construed to be limited thereto.

EXAMPLES 1 TO 8

A polyarylene ester having a main unit of the following formula (U polymer® U-100, manufactured by Unitika Ltd.):

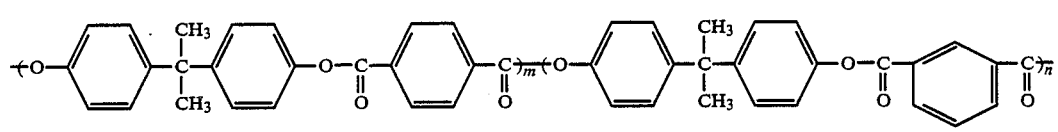

wherein m/n=about 5/5, was mixed with a polycarbonate (IUPILON® S-2000, manufactured by Mitsubishi Gas Chemical K.K.) and an ethylene copolymer consisting of 67% by weight of ethylene, 30.5% by weight of ethyl acrylate and 2.5% by weight of maleic anhydride in the mixing ratios as shown in Table 1 and the mixture was melt-kneaded at 260° to 300° C. with a twin-screw extruder (PCM-30, manufactured by Ikegai Iron Works, Ltd.) to form strands, and the resulting strands were cooled with water and cut to produce pellets.

The pellets thus obtained were subjected to an injection molding at 280° to 320° C. with an injection molding machine (Nestal® 47/28, manufactured by Sumitomo Heavy Industries, Ltd.) to give a test piece for Izod impact test (12.7×64×6.4 mm, without notch) and a test piece for measurement of heat distortion temperature (12.7×127×6.4 mm). The test piece for Izod impact test was notched by cutting with notching knives having various tip radiuses.

The Izod impact test and the measurement of heat distortion temperature were carried out by the methods as defined in ASTM D-256 and D-648, respectively.

REFERENCE EXAMPLES 1 TO 6

In the same manner as described in Examples 1 to 8 except that the polyarylene ester, the polycarbonate and the ethylene copolymer used in Examples 1 to 8 were used in the mixing ratios as shown in Table 1, there were prepared the test pieces, and the properties thereof were measured, likewise. The results are shown in Table 1.

EXAMPLES 9 TO 15

A polyarylene ester having a main unit of the following formula (U polymer® U-100, manufactured by Unitika Ltd.):

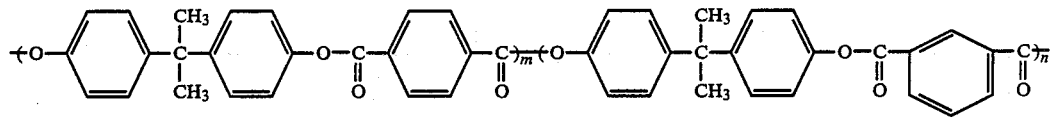

wherein m/n=about 5/5, was mixed with a polyethylene terephthalate (RT-560, manufactured by Toyo Boseki K.K.) and an ethylene copolymer consisting of 67% by weight of ethylene, 30.5% by weight of ethyl acrylate and 2.5% by weight of maleic anhydride in the mixing ratios as shown in Table 2 and the mixture was melt-kneaded at 230° to 300° C. with a twin-screw extruder (PCM-30, manufactured by Ikegai Iron Works, Ltd.) to form strands, and the resulting strands were cooled with water and cut to produce pellets.

The pellets thus obtained were subjected to an injection molding at 250° to 320° C. with an injection molding machine (Nestal® 47/28, manufactured by Sumitomo Heavy Industries, Ltd.) to give a test piece for Izod impact test (12.7×64×6.4 mm, without notch) and a test piece for measurement of heat distortion temperature (12.7×127×6.4 mm). The test piece for Izod impact test was notched by cutting with notching knives having various tip radii.

The Izod impact test and the measurement of heat distortion temperature were carried out by the methods as defined in ASTM D-256 and D-648, respectively. The results are shown in Table 2.

EXAMPLES 16 AND 17

In the same manner as described in Examples 9 to 15 except that the polyarylene ester (U Polymer® U-100, manufactured by Unitika Ltd.), a polybutylene terephthalate (CH-7000, manufactured by Teijin Limited) and the ethylene copolymer used in Examples 9 to 15 were used in the mixing ratios as shown in Table 2,

TABLE 1

| Ex. No. | Components (% by weight) | | | Izod impact strength (kg · cm/cm) Radius of notched part (mm) | | | Heat distortion temperature under 18.6 kg/cm² (°C.) | Polyarylene ester/ Polycarbonate |
|---|---|---|---|---|---|---|---|---|
| | Polyarylene ester | Polycarbonate | Ethylene copolymer | 0 | 0.25 | 0.40 | | |
| Ex. 1 | 63 | 27 | 10 | 32 | 38 | 52 | 155 | 70/30 |
| Ex. 2 | 56 | 24 | 20 | 43 | 55 | 65 | 151 | |
| Ex. 3 | 49 | 21 | 30 | 55 | 66 | 75 | 145 | |
| Ex. 4 | 47.5 | 47.5 | 5 | 22 | 28 | 53 | 149 | 50/50 |
| Ex. 5 | 45 | 45 | 10 | 30 | 40 | 61 | 145 | |
| Ex. 6 | 40 | 40 | 20 | 40 | 60 | 71 | 138 | |
| Ex. 7 | 28.5 | 66.5 | 5 | 20 | 30 | 64 | 137 | 30/70 |
| Ex. 8 | 21 | 49 | 30 | 52 | 77 | 80 | 126 | |
| Ref. Ex. 1 | 70 | 30 | 0 | 8 | 20 | 40 | 160 | 70/30 |
| Ref. Ex. 2 | 35 | 15 | 50 | 67 | 73 | 80 | 100 | |
| Ref. Ex. 3 | 50 | 50 | 0 | 8 | 22 | 53 | 151 | 50/50 |
| Ref. Ex. 4 | 25 | 25 | 50 | 65 | 77 | 85 | 92 | |
| Ref. Ex. 5 | 30 | 70 | 0 | 6 | 25 | 60 | 140 | 30/70 |
| Ref. Ex. 6 | 15 | 35 | 50 | 63 | 81 | 85 | 80 | | there were prepared the test pieces, and the properties thereof were measured, likewise. The results are shown in Table 2.

REFERENCE EXAMPLES 7 TO 13

In the same manner as described in Examples 9 to 15 except that the polyarylene ester, the polyethylene terephthalate or polybutylene terephthalate and the ethylene copolymer used in Examples 9 to 12 were used in the mixing ratios as shown in Table 2, there were prepared the test pieces, and the properties thereof were measured, likewise The results are shown in Table 2.

TABLE 2

| Ex. No. | Components (% by weight) | | | Izod impact strength (kg · cm/cm) Radius of notched part (mm) | | | Heat distortion temperature under 18.6 kg/cm$^2$ (°C.) | Polyarylene ester/ Polyalkylene terephthalate |
|---|---|---|---|---|---|---|---|---|
| | Polyarylene ester | Polyalkylene terephthalate | Ethylene copolymer | 0 | 0.25 | 0.40 | | |
| Ex. 9 | 76 | 19 | 5 | 15 | 32 | 39 | 150 | 8/2 (PET) |
| Ex. 10 | 56 | 14 | 30 | 32 | 38 | 45 | 137 | |
| Ex. 11 | 54 | 36 | 10 | 18 | 31 | 48 | 130 | 6/4 (PET) |
| Ex. 12 | 48 | 32 | 20 | 25 | 34 | 41 | 124 | |
| Ex. 13 | 42 | 28 | 30 | 27 | 37 | 51 | 118 | |
| Ex. 14 | 28.5 | 66.5 | 5 | 14 | 21 | 35 | 108 | 3.7 (PET) |
| Ex. 15 | 21 | 49 | 30 | 25 | 35 | 46 | 96 | |
| Ex. 16 | 54 | 36 | 10 | 16 | 30 | 37 | 125 | 6/4 (PBT) |
| Ex. 17 | 27 | 63 | 10 | 9 | 19 | 29 | 101 | 3/7 (PBT) |
| Ref. Ex. 7 | 80 | 20 | — | 7.5 | 28 | 35 | 152 | 8/2 (PET) |
| Ref. Ex. 8 | 60 | 40 | — | 5 | 15 | 27 | 133 | 6/4 (PET) |
| Ref. Ex. 9 | 30 | 20 | 50 | 20 | 51 | 55 | 88 | |
| Ref. Ex. 10 | 30 | 70 | — | 2 | 10 | 15 | 110 | 3/7 (PET) |
| Ref. Ex. 11 | 60 | 40 | — | 5 | 16 | 30 | 130 | 6/4 (PBT) |
| Ref. Ex. 12 | 30 | 20 | 50 | 28 | 53 | 59 | 83 | |
| Ref. Ex. 13 | 30 | 70 | — | 2 | 12 | 21 | 105 | 3/7 (PBT) |

[Note]:
PET: Polyethylene terephthalate,
PBT: Polybutylene terephthalate

UTILIZATION IN INDUSTRY

The composition of this invention obtained by incorporating an ethylene copolymer consisting of ethylene, an α,β-unsaturated carboxylic acid alkyl ester and maleic anhydride to a composition comprising a polyarylene ester and a polycarbonate or a polyalkylene terephthalate has significantly improved impact properties with less dependency on the radius of notched part without deteriorating the excellent heat distortion resistance and excellent processability, barrier properties, chemical resistance and heat resistance of the composition comprising a polyarylene ester and a polycarbonate or a polyalkylene terephthalate. Accordingly, the composition of this invention is useful for the utilities such as parts of electric and/or electronic equipment, parts of automobiles and parts of office automation equipment, which have been desired to be miniaturized and to have thin-wall.

We claim:
1. A resin composition which comprises
(A) 60 to 99% by weight of a composition comprising 1 to 99% by weight of a polyarylene ester and 99 to 1% by weight of a polycarbonate or a polyalkylene terephthalate, and
(B) 40 to 1% by weight of an ethylene copolymer consisting of 50 to 90% by weight of ethylene, 5 to 49% by weight of an α,β-unsaturated carboxylic acid alkyl ester and 0.5 to 10% by weight of maleic anhydride.
2. The resin composition according to claim 1, wherein the polyarylene ester is a polyester produced from a diphenol or a derivative thereof and an aromatic dicarboxylic acid or a derivative thereof.
3. The resin composition according to claim 2, wherein the diphenol is a diphenol compound of the formula:

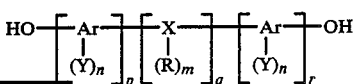

wherein
Ar is an aromatic nucleus,
R is a hydrogen atom, an alkyl group, a halogenated alkyl group, an aryl group, a halogenated aryl group, an aralkyl group, a halogenated aralkyl group, an alkyl-substituted aryl group, a halogenated alkyl-substituted aryl group, an alicyclic group, or a halogenated alicyclic group,
X is an alkylene group or an alkylidene group; or two or more alkylene or alkylidene groups which are mutually bound via an aromatic group, a tertiary amino group, an ether group, a carbonyl group, or a sulfur-containing group; or an alicyclic group, a sulfur-containing group, an ether group, a carbonyl group, or a tertiary amino group,
Y is a halogen atom, a nitro group, or the same as R' or OR', R' is the same as R as defined above,
m is 0 or an integer of up to the number of hydrogen atoms being able to be substituted on group X,
n is 0 or an integer of up to the number of hydrogen atoms being able to be substituted on the aromatic Ar nucleus,
p is an integer of at least one,
q is an integer of 0 to 1, and r is an integer of at least one, provided that when q is 0, r may be 0.

4. The resin composition according to claim 2, wherein the aromatic dicarboxylic acid is an aromatic dicarboxylic acid of the formula:

HOOC—Ar'—COOH wherein Ar' is an arylene which may be substituted by a $C_1$–$C_4$ alkyl group or a halogen atom.

5. The resin composition according to claim 1, wherein the polycarbonate is a 4,4-dihydroxydiarylalkane polycarbonate produced from 4,4-dihydroxydiphenylalkane and phosgene or diphenylcarbonate.

6. The resin composition according to claim 1, wherein the polyalkylene terephthalate is polyethylene terephthalate or polybutylene terephthalate.

7. The resin composition according to claim 1, wherein the ethylene copolymer consists of 60 to 85% by weight of ethylene, 7 to 45% by weight of an α,β-unsaturated carboxylic acid alkyl ester, and 1 to 8% by weight of maleic anhydride.

8. The resin composition according to claim 1, wherein the α-β-unsaturated carboxylic acid alkyl ester of composition (A) is an ester having 3 to 8 carbon atoms.

9. The resin composition according to claim 1, which further comprises polyethylene, polypropylene, polyamide, polysulfone, polyether sulfone, modified polyphenylene oxide, polyphenylene sulfide, phenol resin or epoxy resin.

10. The resin composition according to claim 1, which further comprises a reinforcing agent or a filler.

11. The resin composition according to claim 1, which further comprises glass fiber, carbon fiber, boron fiber, silicone carbide fiber, asbestos fiber or metallic fiber.

12. The resin composition according to claim 1, which further comprises clay, mica, silica, graphite, glass beads, alumina, calcium carbonate or talc.

* * * * *